United States Patent
Huang

(10) Patent No.: US 8,893,419 B2
(45) Date of Patent: Nov. 25, 2014

(54) FRAME STRUCTURE FOR SOLAR CELL MODULE

(75) Inventor: Ting-Huei Huang, Hsinchu (TW)

(73) Assignee: Hulk Energy Technology Co., Ltd., Miaoli County (TW)

( * ) Notice: Subject to any disclaimer, the term of this patent is extended or adjusted under 35 U.S.C. 154(b) by 0 days.

(21) Appl. No.: 13/352,905

(22) Filed: Jan. 18, 2012

(65) Prior Publication Data

US 2013/0134118 A1     May 30, 2013

(30) Foreign Application Priority Data

Nov. 25, 2011    (TW) .............................. 100222404 U

(51) Int. Cl.
*G09F 1/12*            (2006.01)
*H01L 31/048*       (2014.01)

(52) U.S. Cl.
USPC ................ 40/782; 40/780; 136/251; 136/259

(58) Field of Classification Search
CPC ....... Y02E 10/50; Y02E 10/52; H01L 31/048; H01L 31/0482; H01L 31/0422; H01L 31/0522; H01L 31/0527; Y02B 10/12; G09F 1/12; G09F 15/0012; A47G 1/0644; A47G 1/06; A47G 1/143; A47G 1/0605; A47G 1/14
USPC .............................. 40/780–785; 136/251, 259
See application file for complete search history.

(56) References Cited

U.S. PATENT DOCUMENTS

| | | | | |
|---|---|---|---|---|
| 3,514,886 A | * | 6/1970 | Drakard | 40/766 |
| 4,136,470 A | * | 1/1979 | Barz | 40/782 |
| 4,665,676 A | * | 5/1987 | Drzemala | 52/656.9 |
| 4,839,974 A | * | 6/1989 | Walter | 40/784 |
| 4,877,213 A | * | 10/1989 | Lambert | 248/451 |
| 5,515,629 A | * | 5/1996 | Johansson | 40/745 |
| 2010/0243034 A1 | * | 9/2010 | Hu et al. | 136/251 |
| 2011/0253201 A1 | * | 10/2011 | Morita et al. | 136/251 |

FOREIGN PATENT DOCUMENTS

| | | |
|---|---|---|
| JP | 7056070 | 3/1995 |
| JP | 2001298202 | 10/2001 |
| TW | 200816506 | 4/2008 |

* cited by examiner

*Primary Examiner* — Casandra Davis
(74) *Attorney, Agent, or Firm* — WPAT, PC; Justin King

(57) ABSTRACT

A frame structure for solar cell module: comprises: two short sidebars, two long sidebars and four corner connectors in a manner that each short sidebar is connected to the two long sidebars at two opposite ends using two of the four corner connectors. Each long sidebar is comprised of a first extension wall, a second extension wall, a third extension wall and a first connection wall in a manner that the first, the second and the third extension walls are disposed perpendicular to the first connection wall while being connected to a side of the first connection wall that is orientated facing toward another long sidebar, and simultaneously allowing the first and the second extension walls to be connected respectively to the two ends of the first connection wall and the third extension wall to be disposed at a position between the first and the second extension walls.

5 Claims, 4 Drawing Sheets

FRAME STRUCTURE FOR SOLAR CELL MODULE

FIELD OF THE INVENTION

The present invention relates to solar cell technology, and more particularly, to a frame structure for solar cell module.

BACKGROUND OF THE INVENTION

For a conventional solar cell module based on copper indium selenide (CIS), it is basically formed as a solar cell that is made by depositing a metallic back layer, a p-type absorber layer, a high-resistance buffer layer and a n-type window layer on a substrate. Moreover, after being sandwiched inside a weather-resistance film made of a filling material, such as ethylene vinyl acetate (EVA), the so-constructed solar cell is further being covered by a compactly fitted inside a glass housing while being framed by a frame structure that can be made of aluminum. Thereby, the solar cell module that is being framed inside the frame structure is capable of preventing the incursion of water and moisture into the glass housing and thus improving the weather resistance of the solar cell module.

Generally, while viewing a conventional CIS-based solar cell module, which is formed as a solar cell element sandwiched between a glass cover and a glass substrate and framed inside an aluminum frame structure while having an electrode assembly protruding outside the frame structure, only the aluminum frame structure, the electrode assembly and the solar cell element is clearly visible. In addition, in some cases, the aluminum frame structure is coated in a color the same as that of the solar cell element, usually in black. However, since the electrodes in many conventional solar cell modules are silver in color, as the metal lines 71 formed on the solar cell element that is shown in FIG. 2, the appearance of the resulting solar cell module may not be very presentable by the different coloration of electrode assembly and the solar cell element.

In many conventional solar cell modules as the one disclosed in Japanese patent laid-open Publication No. 2001-298202, there are a plurality of bumps formed on the surface of a colorless transparent float glass, such as a Borofloat glass, by means of screen printing using a ceramic ink, whereas the plural bumps are to be used for enhancing the diffuse reflection of the light projected on the glass, resulting that the light income of the solar cell module can be increased. However, although there are the plural bumps formed on the surface of a colorless transparent float glass, still the electrode assembly is left exposed and thus the appearance of the solar cell module is not improved.

Generally, the ceramic ink that is black in color is made of zirconium oxide or aluminum oxide that is doped with about 5%~20% in weight of any one or two dying materials selected from the group consisting of: manganese dioxide, ferrosoferric oxide, cobaltous oxide, nickelous oxide, and chrome oxide, by means of calcination, as disclosed in Japanese patent laid-open Publication No. 7-56070.

From the above description, it is noted that in conventional CIS-based solar cell modules, the silver-colored electrode assembly, as the metal lines 71 shown in FIG. 2, is always exposed without any effort trying to unify the coloration of the whole CIS-based solar cell module in view of beautification.

For hiding the silver-colored electrode assembly or for enabling the same to be not as obvious as it is now, it is possible to add an additional step in the solar cell module manufacturing process for coating a layer of clack ink on the silver-colored electrode, or attaching a black vinyi tape on the silver-colored electrode assembly. However, the addition of such the aforesaid step in the solar cell module manufacturing process not only will cause the manufacturing process to become much more complex, but also will cause the manufacturing cost to increase accordingly.

Moreover, there is a solar cell module disclosed in TW pat. Pub. No. 200816506, in which the silver-colored electrode assembly is hidden under a coating of a black ceramic layer for unifying the coloration of the whole solar cell module and thus improving the appearance of the same, without causing the manufacturing process of the solar cell module to become too complex. That is, using the technique disclosed in the aforesaid patent publication, the solar cell element and the electrode assembly formed thereon are enabled to appear in the same color. In detail, there is a rim of clack ceramic layer formed around the periphery of the cover glass at position corresponding to the silver-colored electrode assembly on the solar cell element, by that the coloration of the whole solar cell module is unified and thus the beautification of the same is improved. It is noted that although the formation of the black ceramic layer can be achieved at the same time during the thermal strengthening treatment of the cover glass, the manufacturing cost is still increased due to not only the comparatively longer heating time required for achieving the formation of the black ceramic layer, but also due to the material cost of the black ceramic layer as well as the additional step required for processing the same.

SUMMARY OF THE INVENTION

The object of the present invention is to provide a frame structure for solar cell module, which is substantially a low-cost, compact structured frame capable of directly hiding the metal electrode lines on a solar panel without causing any increase in manufacturing cost or time.

To achieve the above object, the present invention provides a frame structure for solar cell module, which is composed of two short sidebars, two long sidebars and four corner connectors as a rectangular-shaped structure in a manner that each short sidebar is connected to the two long sidebars at two opposite ends thereof using two of the four corner connectors, and is characterized in that each long sidebar is comprised of a first extension wall, a second extension wall, a third extension wall and a first connection wall in a manner that the first, the second and the third extension walls are disposed perpendicular to the first connection wall while being connected to a side of the first connection wall that is orientated facing toward another long sidebar, and simultaneously allowing the first and the second extension walls to be connected respectively to the two ends of the first connection wall and the third extension wall to be disposed at a position between the first and the second extension walls; the space defined between the first and the third extension wall is provided for a solar panel to inset therein; and the first extension wall of each long sidebar further comprises a tongue strip that is arranged extending in a direction toward another long sidebar so as to be used for shielding a metal line formed on the solar panel.

In an embodiment of the invention, there is a second connection wall arranged at a position between the second and the third extension walls of each long sidebar in a manner that the second connection wall is arranged spaced from the corresponding first connection wall by a distance and parallel thereto while allowing the two opposite ends of the second connection wall to be connected respectively to the second and the third extension walls.

In another embodiment of the invention, by the arrangement of the second extension wall, the third extension wall, the first connection wall and the second connection wall in each long sidebar, an accommodation space is defined to be provided for an end of the corresponding corner connecter to inset therein.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
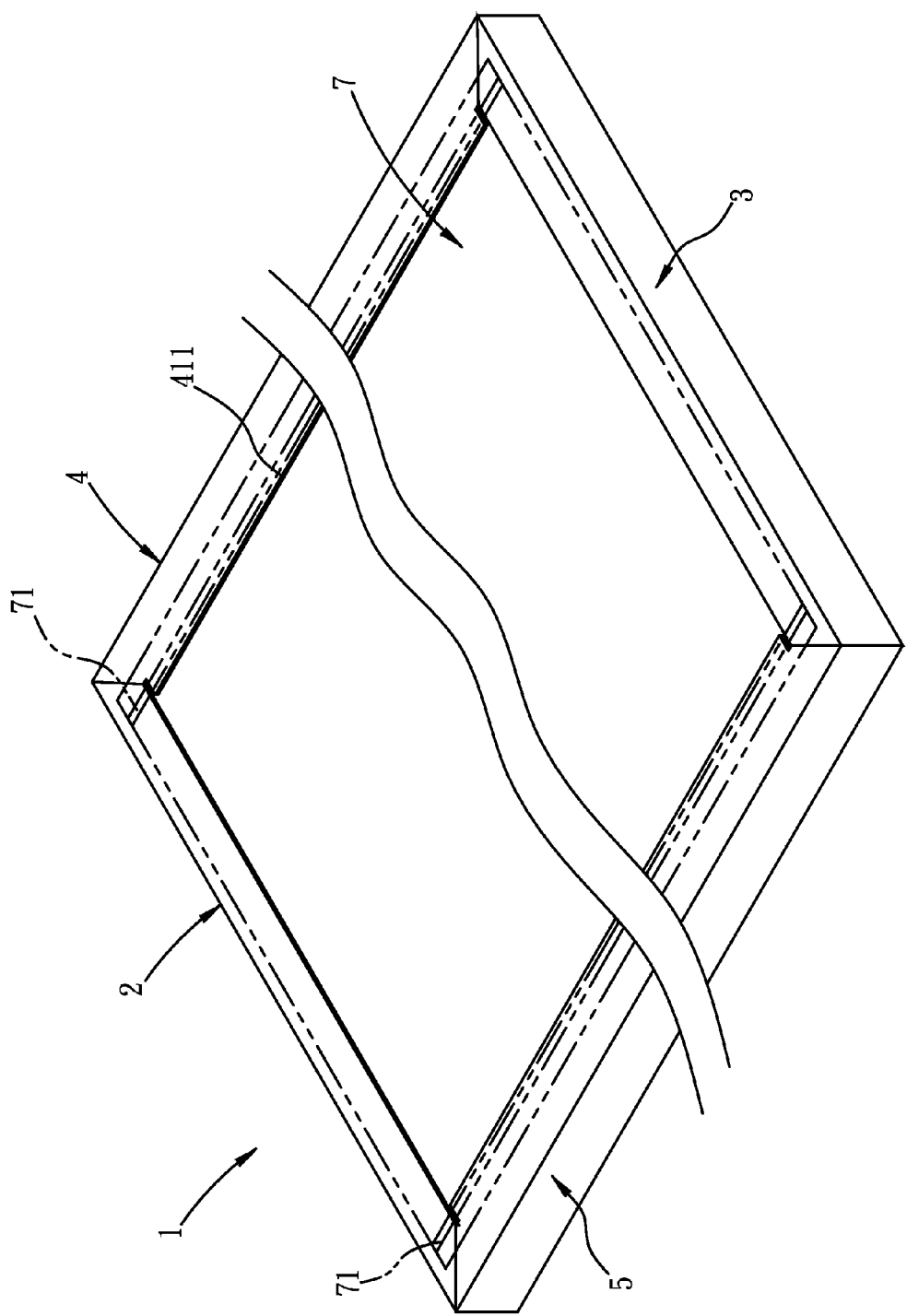
FIG. 1 is a schematic diagram showing a frame structure for solar cell module according to an embodiment of the invention.
Figure 2:
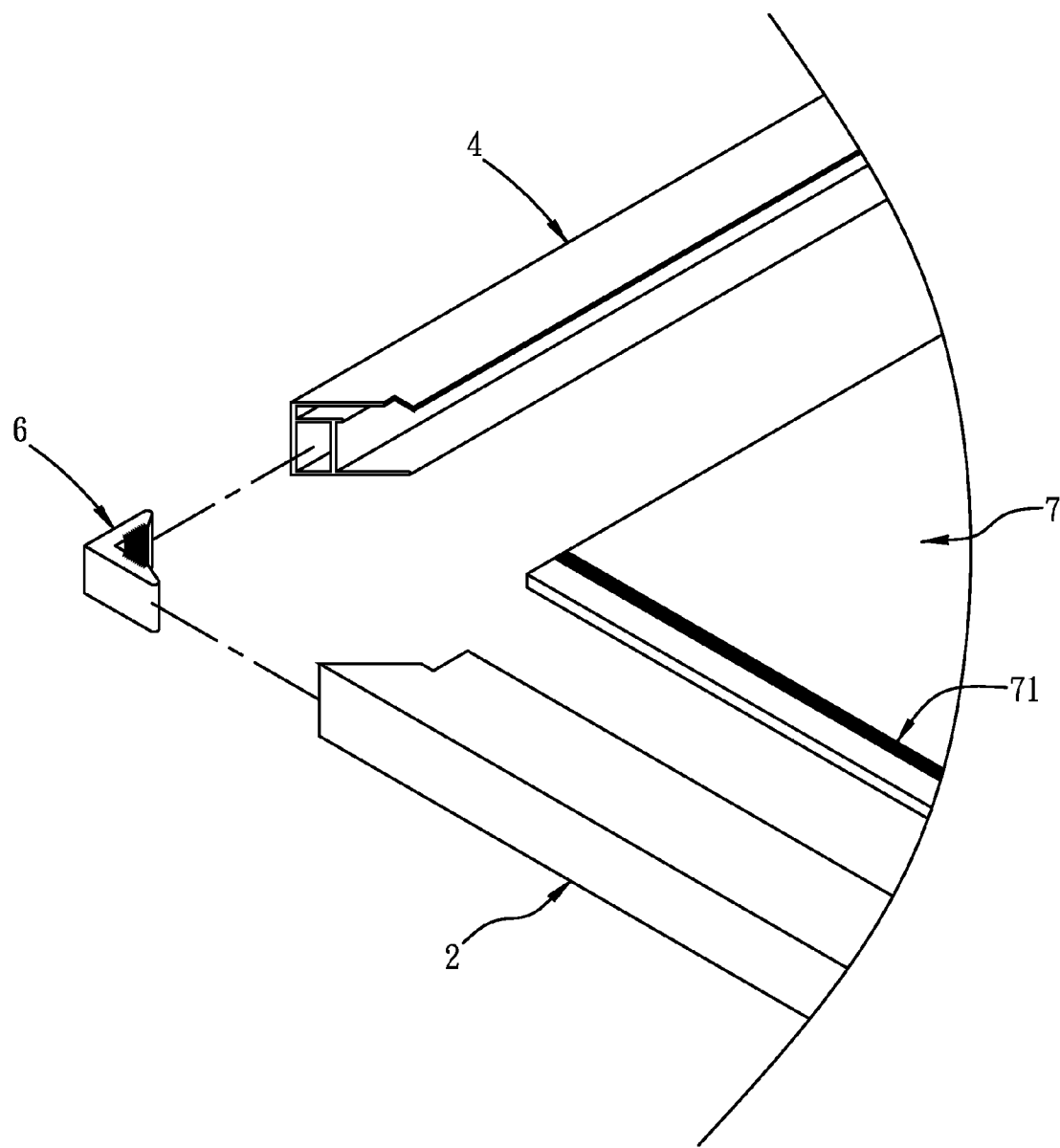
FIG. 2 is an explode view of a frame structure for solar cell module according to an embodiment of the invention.
Figure 3:
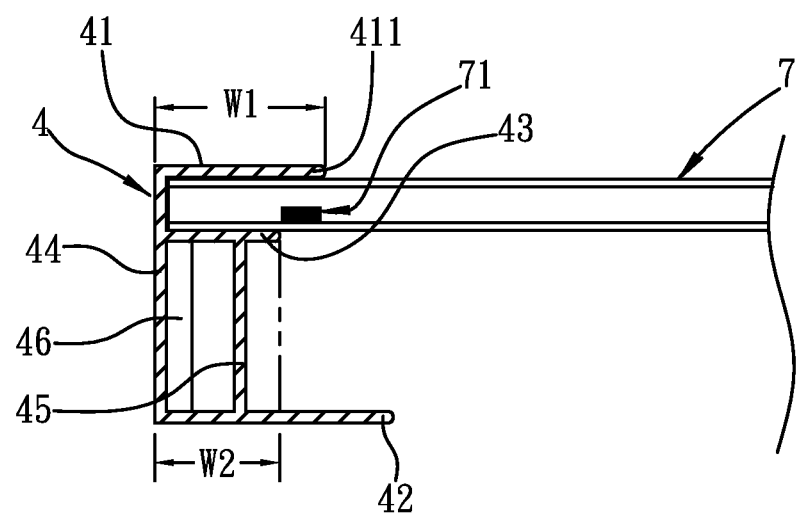
FIG. 3 is a partial cross sectional view of a frame structure for solar cell module according to an embodiment of the invention.
Figure 4:
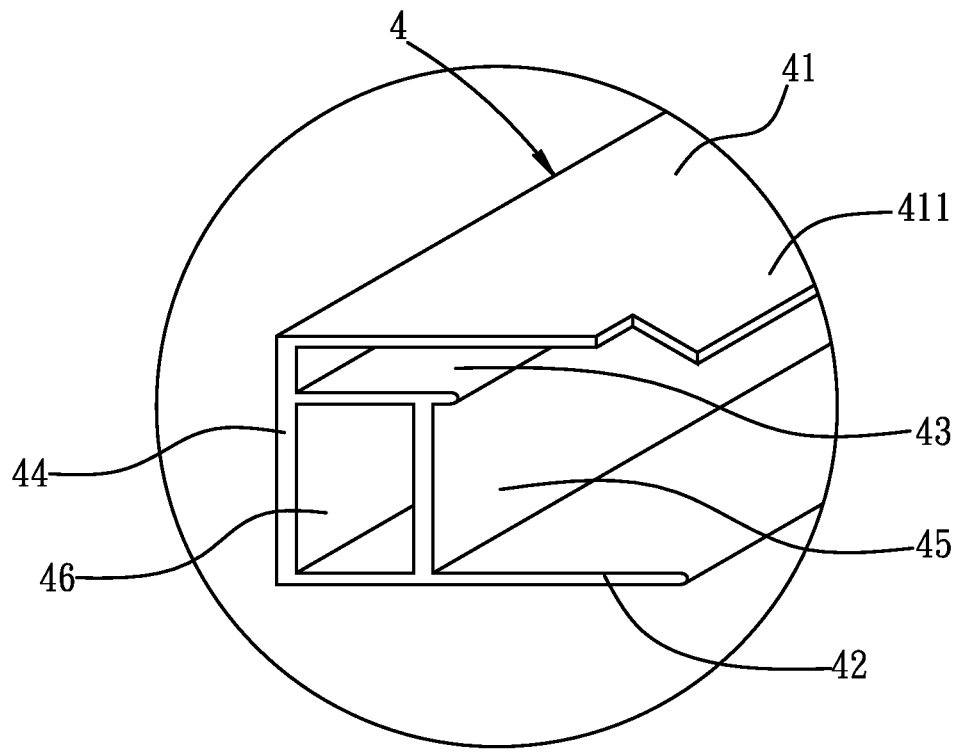
FIG. 4 is an enlarged view showing a partial cross section of a frame structure according to an embodiment of the invention.

Please refer to FIG. 1 to FIG. 4, which are a schematic diagram showing a frame structure for solar cell module according to an embodiment of the invention; an explode view of a frame structure for solar cell module according to an embodiment of the invention; a partial cross sectional view of a frame structure for solar cell module according to an embodiment of the invention; and an enlarged view showing a partial cross section of a frame structure according to an embodiment of the invention.

As shown in FIG. 1 to FIG. 4, the frame structure for solar cell module 1, which is composed of two short sidebars 2, 3, two long sidebars 4, 5 and four corner connectors 6 as a rectangular-shaped structure in a manner that each short sidebar 2 or 3 is connected to the two long sidebars 4 and 5 at two opposite ends of the short sidebar 2 or 3 using two of the four corner connectors 6. That is, the short sidebar 2 is connected to the long sidebar 5 by an end thereof though the connection of one corner connector 6 while allowing another end thereof to be connected to the long sidebar 4 using another corner connector 6, and simultaneously, the short sidebar 3 is connected to the long sidebar 5 by an end thereof though the connection of one corner connector 6 while allowing another end thereof to be connected to the long sidebar 4 using another corner connector 6. In an embodiment shown in FIG. 1, by arranging the short sidebar 2 on the top, the sort sidebar 3 on the bottom, the long sidebar 4 on the right and the long sidebar 5 on the left, a frame can be achieved for framing and holding a solar panel 7.

It is noted that the two long sidebars 4 and 5 are formed the same in structure. Taking the long sidebar 4 for example, the long sidebar 4 is comprised of a first extension wall 41, a second extension wall 42, a third extension wall 43 and a first connection wall 44 in a manner that the first, the second and the third extension walls 41, 42 and 43 are disposed perpendicular to the first connection wall 44 while being connected to a side of the first connection wall 44 that is orientated facing toward another long sidebar 5, and simultaneously allowing the first and the second extension walls 41 and 42 to be connected respectively to the two ends of the first connection wall 44 and the third extension wall 43 to be disposed at a position between the first and the second extension walls 41 and 42, resulting that the space defined between the first and the third extension wall 41 and 43 to be provided for a solar panel 7 to inset therein. Moreover, the first extension wall 41 further comprises a tongue strip 411 that is arranged extending in a direction toward another long sidebar 5 so as to be used for shielding a metal line electrode 71 formed on the solar panel 7.

In addition, there is a second connection wall 45 arranged at a position between the second and the third extension walls 42 and 43 of each long sidebar 4, or 5 in a manner that the second connection wall 45 is arranged spaced from the corresponding first connection wall 44 by a distance and parallel thereto while allowing the two opposite ends of the second connection wall 45 to be connected respectively to the second and the third extension walls 42 and 43.

Moreover, by the arrangement of the second extension wall 42, the third extension wall 43, the first connection wall 44 and the second connection wall 45 in each long sidebar 4 or 5, an accommodation space 46 is defined to be provided for an end of the corresponding corner connecter 6 to inset therein.

To sum up, the aforesaid a frame structure for solar cell module, of the present invention is substantially a low-cost, compact structured frame capable of directly hiding the metal electrode lines on a solar panel without causing any increase in manufacturing cost or time.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A frame assembly structure holding a solar cell, comprising:
    a solar cell, comprising an electrode, distanced from an edge of said solar cell for a first distance inclusive of the width of the electrode; a first sidebar;
    a second sidebar;
    a third side bar;
    a fourth side bar;
    a first corner connector, connecting to said first sidebar and said second sidebar;
    a second corner connector, connecting to said second sidebar and said third sidebar;
    a third corner connector, connecting to said third sidebar and said fourth sidebar; and
    a fourth corner connector, connecting to said fourth sidebar and said first sidebar;

wherein said first sidebar further comprises:
- a first extension wall with a first width, wherein said first width is longer than the first distance;
- a second extension wall;
- a third extension wall with a second width, located between said first extension wall and said second extension wall, and parallel to said first extension wall and said second extension wall;
- an outer connection wall connecting to said first extension wall, said second extension wall, and said third extension wall; and
- an inner connection wall connecting to said second extension wall and said third extension wall;
- wherein said solar cell is placed between said first extension wall and said third extensional wall.

2. The frame assembly structure holding a solar cell of claim 1, wherein the first sidebar further comprises a second connection wall disposed in parallel to the first connection wall, wherein one end of the second connection wall is attached to the second extension wall, and the other end of the second connection wall is attached to the third extension wall.

3. The frame assembly structure holding a solar cell of claim 2, wherein the first corner connector and fourth corner connector are disposed in an accommodation space within the arrangement of the second extension wall, the third extension wall, the first connection wall and the second connection wall in the first sidebar.

4. The frame assembly structure holding a solar cell of claim 1, wherein the second width is shorter than the first width.

5. The frame assembly structure holding a solar cell of claim 1, with the first extension wall further comprising a notch at each end of the first extension wall to provide access to said electrode of said solar cell disposed within the frame structure.

* * * * *